(12) United States Patent
Zhang

(10) Patent No.: US 7,635,100 B2
(45) Date of Patent: Dec. 22, 2009

(54) PROCESS AND SYSTEM FOR TREATING STEEL SLAG

(76) Inventor: Weitian Zhang, No. 6-4-101, Yuannan Building, Xixin Village, Lunan District, Tangshan, Hebei 063020 (CN)

( * ) Notice: Subject to any disclaimer, the term of this patent is extended or adjusted under 35 U.S.C. 154(b) by 405 days.

(21) Appl. No.: 11/573,202

(22) PCT Filed: Sep. 15, 2004

(86) PCT No.: PCT/CN2004/001046

§ 371 (c)(1),
(2), (4) Date: Feb. 2, 2007

(87) PCT Pub. No.: WO2006/012781

PCT Pub. Date: Feb. 9, 2006

(65) Prior Publication Data

US 2008/0029538 A1      Feb. 7, 2008

(30) Foreign Application Priority Data

Aug. 2, 2004 (CN) .......................... 2004 1 0070342

(51) Int. Cl.
*B02C 19/00* (2006.01)
(52) U.S. Cl. ........................ 241/23; 241/24.14; 241/65; 241/79.1
(58) Field of Classification Search .............. 241/24.14, 241/23, 65, 79.1
See application file for complete search history.

(56) References Cited

U.S. PATENT DOCUMENTS 3,316,075 A * 4/1967 Grady ........................... 65/19
4,124,404 A * 11/1978 Suzuki et al. ............... 106/765
6,251,160 B1 * 6/2001 Edlinger ....................... 75/434

FOREIGN PATENT DOCUMENTS

CN         1414115         4/2003
JP         53007501     *  1/1978

* cited by examiner

*Primary Examiner*—Mark Rosenbaum
(74) *Attorney, Agent, or Firm*—J.C. Patents

(57) ABSTRACT

This invention relates to a process and system for treating steel slag, which comprises: collecting the steel slag into a tank and carrying the tank onto a tipping device by a hoisting equipment; operating the tipping device to transport the steel slag to a granulating device and granulating the steel slag in the granulating device to form granulated slag; transporting the granulated slag into a drying room with a conveyor, wherein the granulated slag is continuously dried in the drying room at a temperature between 200-300° C. for 30-60 second using exhaust heat from a converter; and transporting dried granulated slag, with the conveyor, to a magnetic separation device to separate carbon metal grains from nonmetal grains contained in the granulated slag.

4 Claims, 8 Drawing Sheets

PROCESS AND SYSTEM FOR TREATING STEEL SLAG

FIELD OF THE INVENTION

The present invention relates to a process and system for treating steel slag. The process and system can separate carbon metal grains from nonmetal grains.

TECHNICAL BACKGROUND

Chinese patent document No. CN02135756 disclosed a tilting-type water-hardening process for treating steel slag. This process uses a water-quench tank and a stanchion beside the tank. On one side of the stanchion is a granulator. When melt steel slag was poured into a slag jar on a truck and carried to the water-quench tank, the slag jar is tilted by operating the drop hanger of the windlass and the lifting-lug of the slag tar. The tipping leading arm on the slag jar will fall on the stanchion when certain titling angle is achieved and the slag jar will slowly rotate around the rotating shaft and pour the steel slag into the water-quench tank. At the same time, pressurized water in the granulator will be ejected and form a water screen to granulate the steel slag. The granulated slag is then stored in a slag storing area. The steel slag made from this invention has the characteristics that the granularity is small and the shape of grains is more regular. This invention does not pollute environment because the processed steel slag can be used as raw material and does not take a large space to store. Therefore, there is a need for a process and system for treating steel slag.

SUMMARY OF THE INVENTION

The aim of the invention is to provide a process and system for treating steel slag, which can process the steel slag and separate carbon metal grains from nonmetal grains.

The aim of the invention is realized by providing a process for treating steel slag, characterized by:

collecting the steel slag into a tank and carrying the tank to a tipping device by a hoisting equipment;

starting up this tipping device and pouring the steel slag into a metal granulating device and granulating the steel slag to form granulated slag;

transporting the granulated slag into a drying room with a vertical rising conveyor for continuously drying the granulated slag by means of exhaust heat from a converter. The drying temperature is in the range of 200-300° C. and the drying time is in the range of 30-60 second;

transporting the dried granulated slag into a magnetic extractor with the vertical rising conveyor for magnetic-separation treatment, so as to separate carbon metal grains from nonmetal grains in the magnetic extractor.

A system for treating steel slag is characterized in that it comprises a hoisting equipment for transporting the slag tank to the tipping device, the outlet of the tipping device connects with an inlet groove of a slag granulating device, and the outlet gate of the slag granulating device connects with a vertical rising conveyor, an exhaust-heat drying room is provided in the middle portion of the conveyor, a first magnetic separation device is provided at an inner side of the material flow from the outlet of the conveyor, and a second magnetic separation device is provided at outer side of the material flow from the outlet of the conveyor and under the first magnetic separation device. The tipping device has a tipping base, a tipping framework, a front stanchion, a winding and raising mechanism. The exhaust-heat drying room is connected to the hot air outlet of a heat exchanger via a pipe.

The present invention has the following advantages:

1. The present invention can greatly shorten the slag treating process.
2. The present invention uses double magnetic separations which can increase the recovery rate of metal.
3. Due to the use of exhaust heat of the converter in drying the slag grains, the present invention can conserve energy.
4. Since the metal content is low in the slag grains obtained by the process of the present invention, they can be recycled and reused so as to improve environment protection.

BRIEF DESCRIPTION OF DRAWINGS

This invention is further described together with the drawings and the embodiments as follows.

EMBODIMENTS

Example 1

A process for treating steel slag comprises:

collecting the steel slag from a converter and placing it into a tank, and carrying the tank onto a tipping device;

operating the tipping device to pour the steel slag into a granulating device, wherein the steel slag is treated by the granulating device to form slag grains, the diameter of the slag grains is less than 6 mm, and the processing capability of the granulating device is 2000 ton/day;

transporting the slag grains into a drying room with a conveyor and continuously drying the slag grains using exhaust heat from a converter at a temperature of 200-300□ for 30-60 second;

transporting the dried slag grains into a magnetic separation device with the conveyor for magnetically separating carbon metal grains from nonmetal grains, wherein the recovery rate of the carbon metal grains can reach 98% in this case.

Example 2

Figure 1:
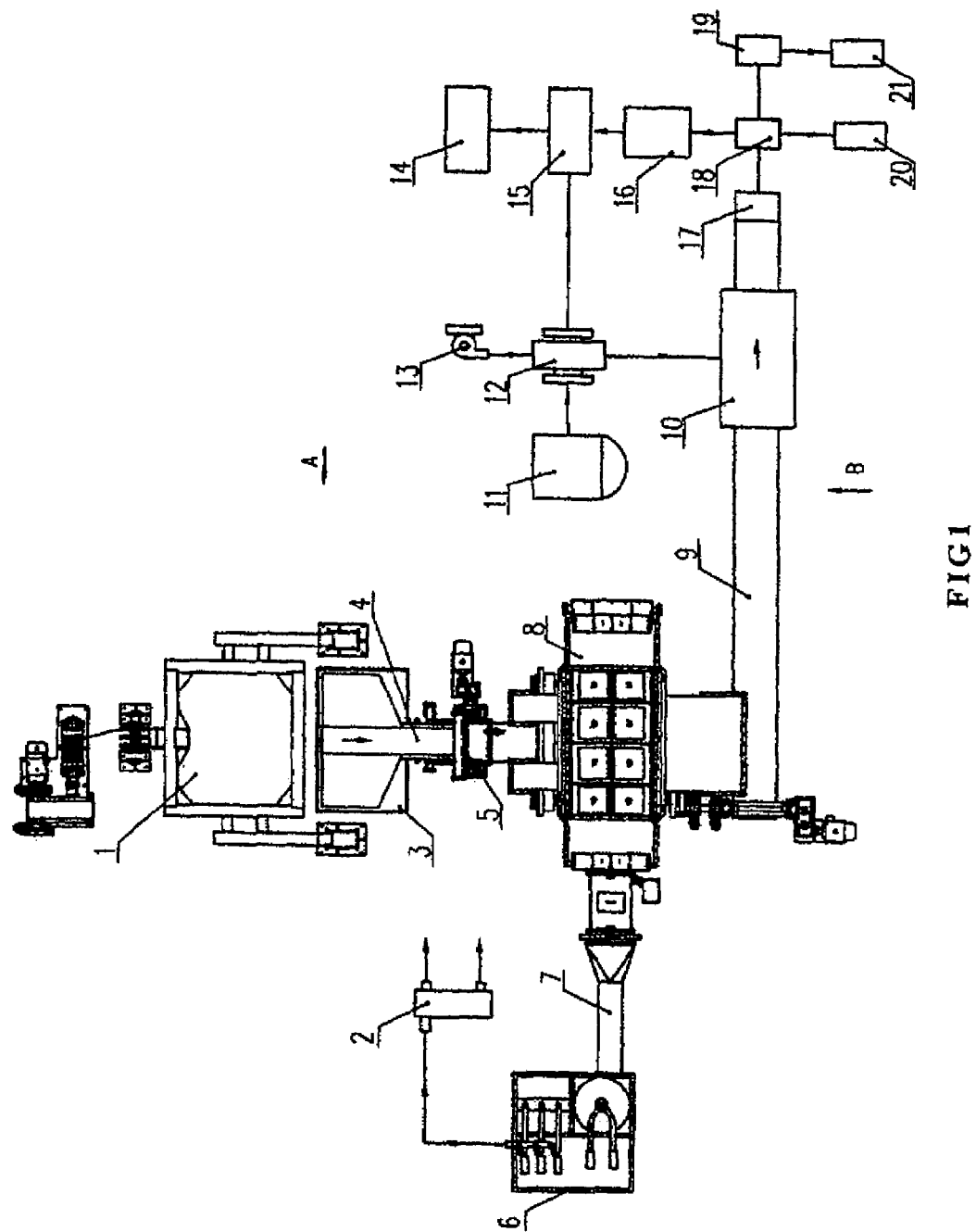
FIG. 1. is a schematic view of the system according to the invention.
Figure 2:
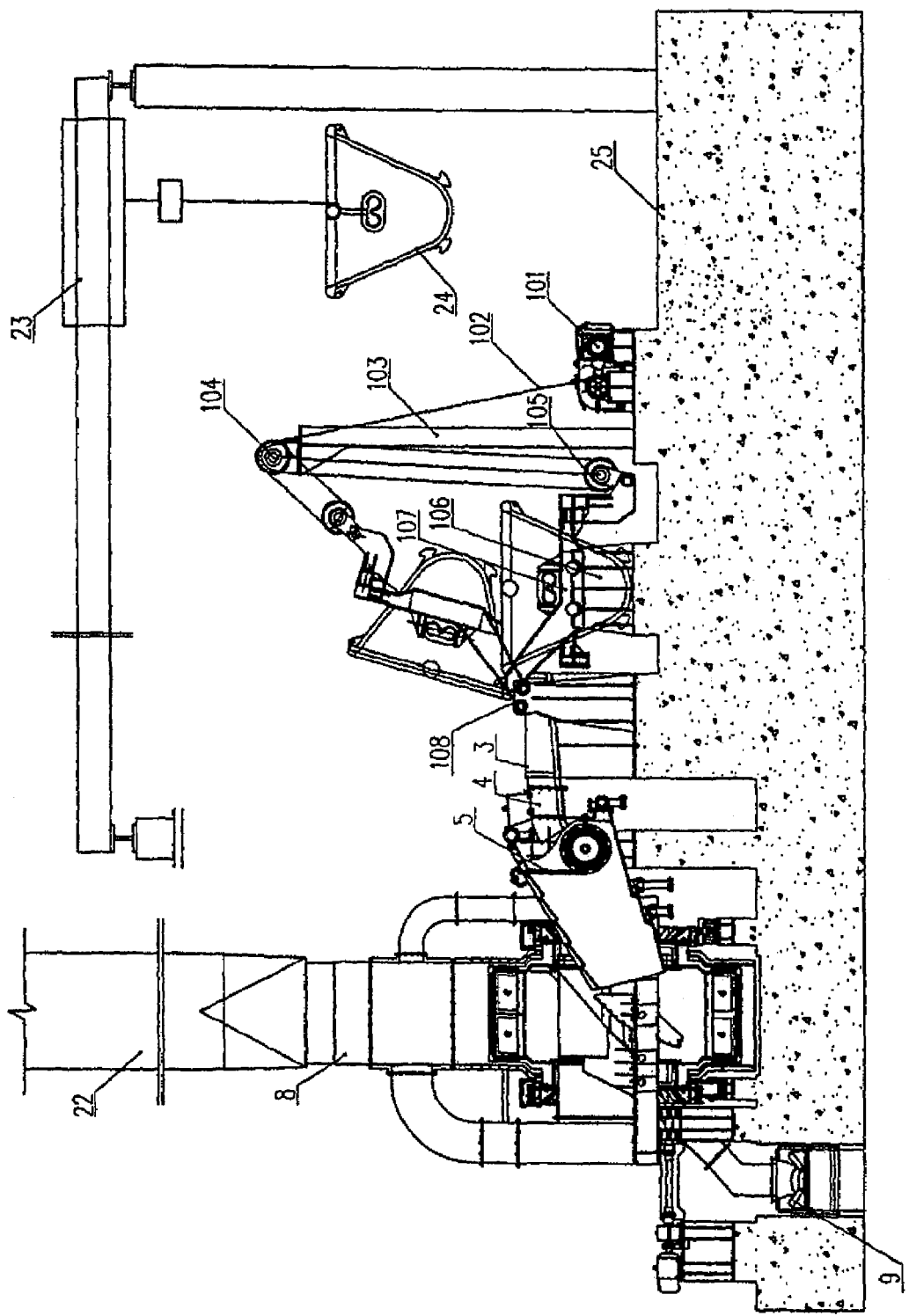
FIG. 2. is a schematic view of the slag granulating device according to the invention (rotating view in A direction of FIG. 1).
Figure 3:
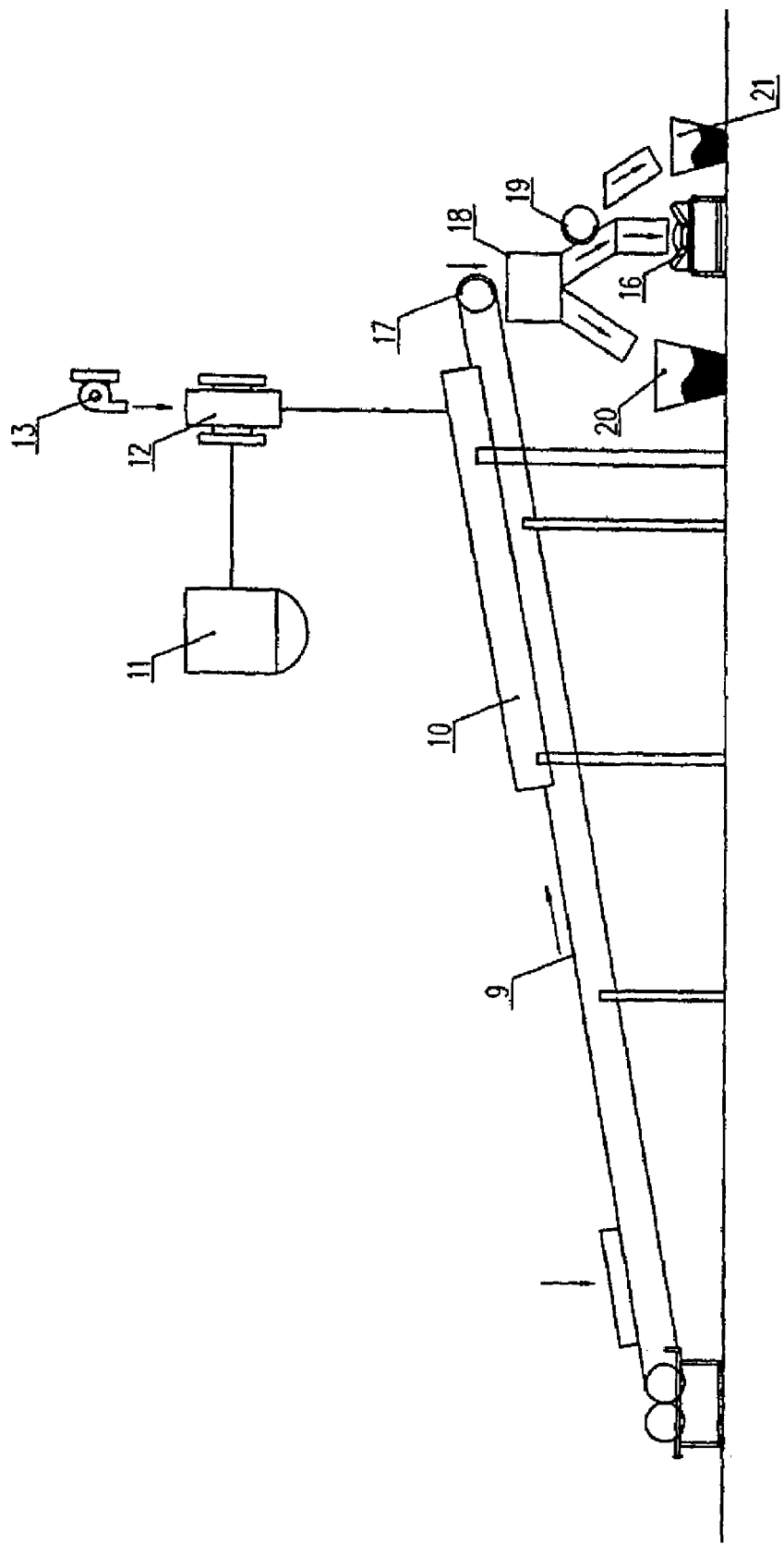
FIG. 3. is schematic view of the slag grain drying and magnetic separation device according to invention.

As shown in FIG. 1, FIG. 2, and FIG. 3, according to the process of example 1, there is a hoisting conveying device which carries a slag tank 24 onto a tipping device 1 in the system for treating steel slag. The hoisting conveying device can be a conventional overhead traveling crane 23 or gantry crane. A downspout 3 connects the outlet of the tipping device 1 with a gully head 4 of a granulating device 8. An outlet 82 of the granulating device 8 connects with a conveyor 9. The conveyor 9 can be a heat resistant belt conveyor and there is a drying room 10 in the middle section of it. A first level magnetic separation device 17 is provided at the inner side of the materiel flow from the exit of the conveyor 9 and a second level magnetic separation device 19 is provided at the outer side of the materiel flow and under the first level magnetic separation device 17. There is a honeycomb duct 18 between the first and second separation devices. The materiel flow mentioned above refers to the parabolic locus of the granulated slag formed under the gravity when the granulated slag left the conveyor. Because the diameter or traverse dimension of the materiel flow is quite large and the velocity is high, the carbon metal grains near the magnetic separation device 17 will be separated from the material flow and drop into a metal collection container 20 through the honeycomb duct 18, while the carbon metal grains further away from the first magnetic separation device 17 will continue to travel downward with the material flow and, when arriving at the position of the second level magnetic separation device 19, these carbon metal grains will be separated from the material flow and drop into a metal collection container 21. The refined granulated slag will drop onto a second belt conveying device 16, and be carried into a medium speed mill 15 by the second belt conveying device 16. The refined granulated slag is processed into fine powders in the medium speed mill 15 and, then, transported with a belt conveying device and deposited in a storehouse 14 for future use. In this embodiment, the granulating slag device also includes an auxiliary system that is composed of a high pressure water supply device 2, a backwater device 7 and a control device 6.

In this embodiment, the tipping device mentioned above is consisted of a tipping base 106, a tipping frame 107, a front stanchion 108 and a winding elevating gear 101. The winding elevating gear 10 is consisted of a steel wire 102, a upright stanchion 103, a crown block 104 and a traveling block 105. The traveling block 105 is fixed on the tipping frame 107.

In this embodiment, the drying room 10 is connected to a hot air outlet of a heat exchanger 12 through a pipeline. The heat exchanger 12 is installed on a smoke cover 11 of the converter. The heat exchanger 12 has a conventional structure and, for example, is consisted of a shell body, a fan 13, an air input pipeline, a hot air outlet, and pipelines for heat exchange. Therefore, it will not be described in detail here. The drying room 10 is a box-shaped metal cover with an insulating layer provided on its outer surface, and a plurality of hot air jet nozzles are provided on the top of the drying room 10. The heat-resistant belt conveyor 9 travels through the drying room 10. Furthermore, the heat exchanger 12 can provide the medium speed mill 15 and the drying room 10 with hot air at the same time.

Figure 11:
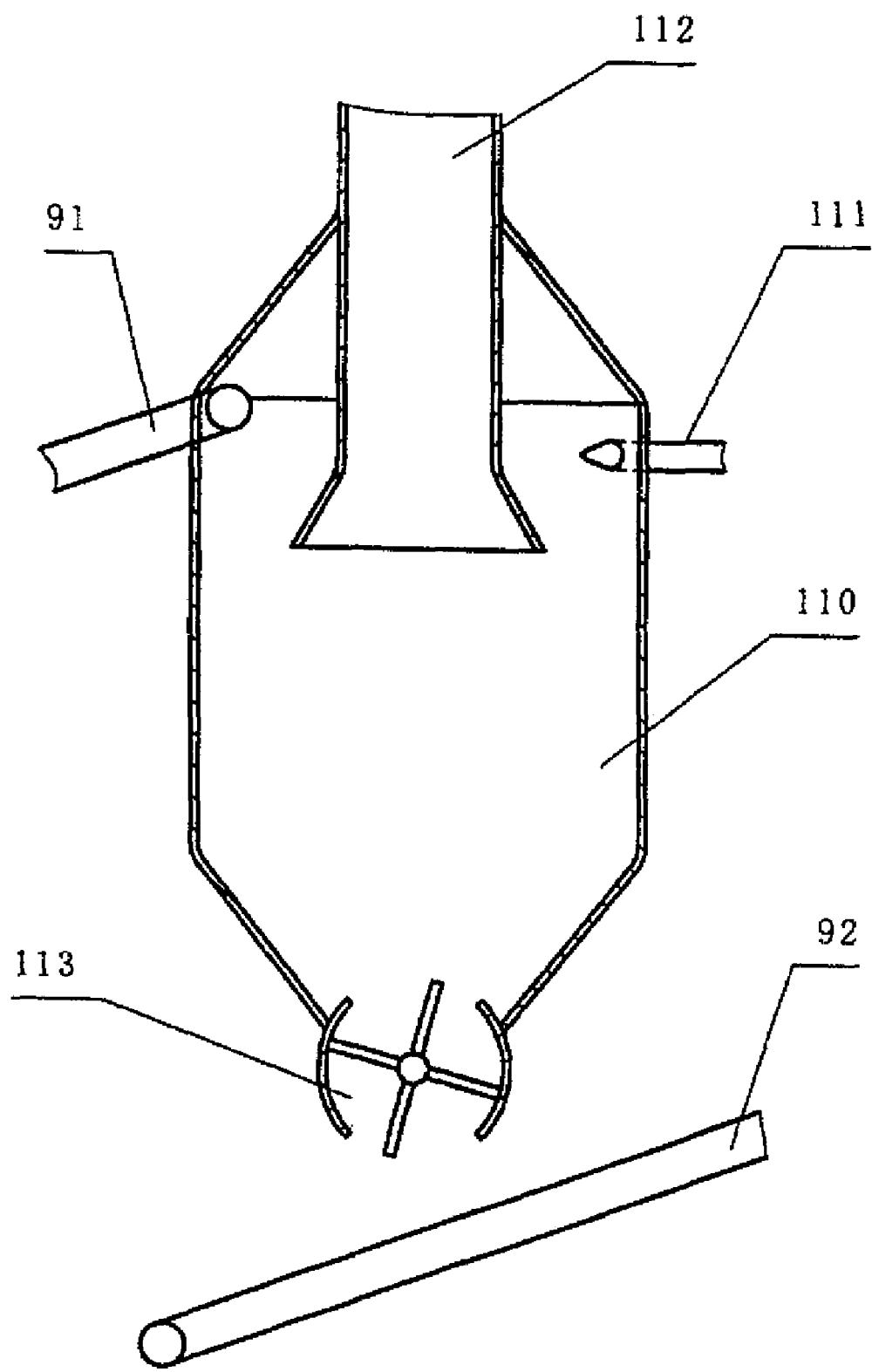

As shown in FIG. 11, in order to increase the drying efficiency of the granulated slag, the drying room 10 can adopt a upright tubular structure. The drying room includes a upright tubular body 110, a vent 112, a hot air inlet 111, and a blocking valve 113. The drying room is connected with a first conveyor belt 91 on its top part, and the blocking valve 113 on the bottom part is coupled to a conveyor belt for transporting dried slag grains. The vent 112 is installed on the center of the top roof of the tubular body 110. The hot air inlet 111 is positioned at top part of the tubular body 110 and directed along the tangent direction of the cylindrical side wall of tubular body 110. After hot air from hot air inlet 111 enters tubular body 110, it forms a helical hot air flow. The hot air flow fully contacts the falling granulated slag and rapidly dries the slag grains. The exhaust gas is discharged from the vent 112 and the dried granulated slag drops onto a dry materiel conveyor belt 92 to be transported to a magnetic separation device.

Figure 4:
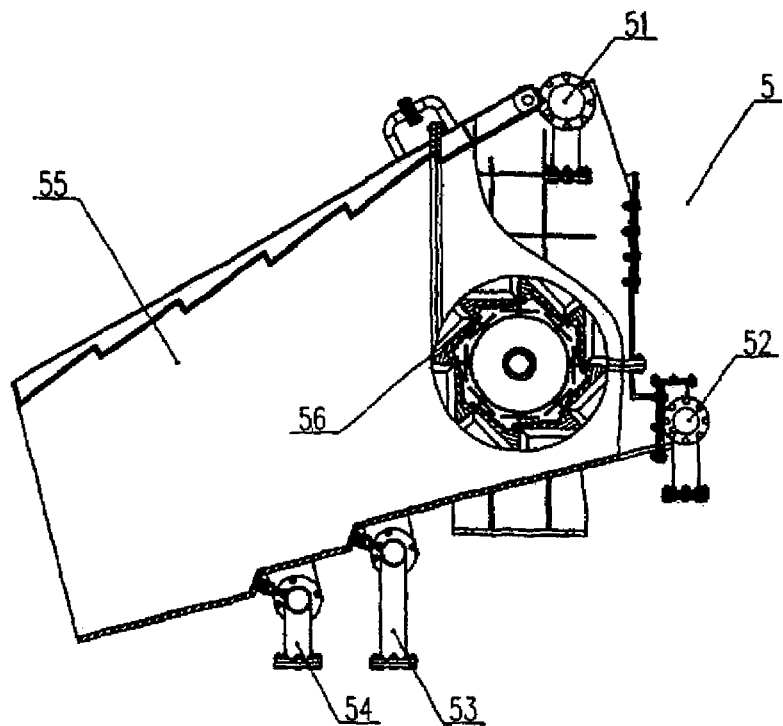
FIG. 4. is schematic view of the granulating device according to the invention (partial enlarged view of FIG. 10).
Figure 5:
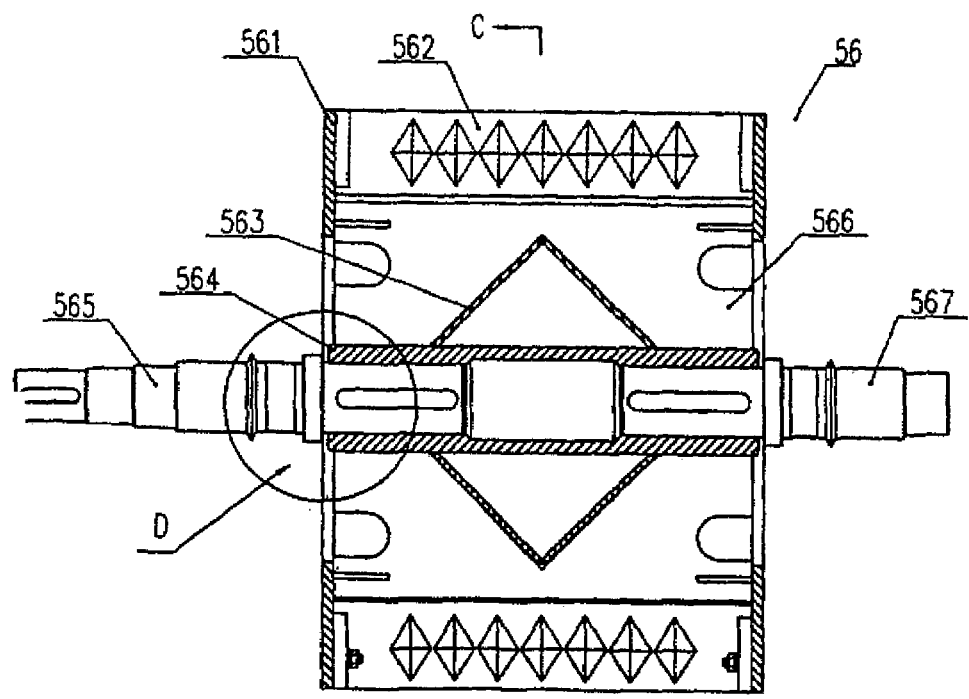
FIG. 5. is a longitudinal cross-sectional view of the granulating gear of the granulating device according to the invention.
Figure 10:
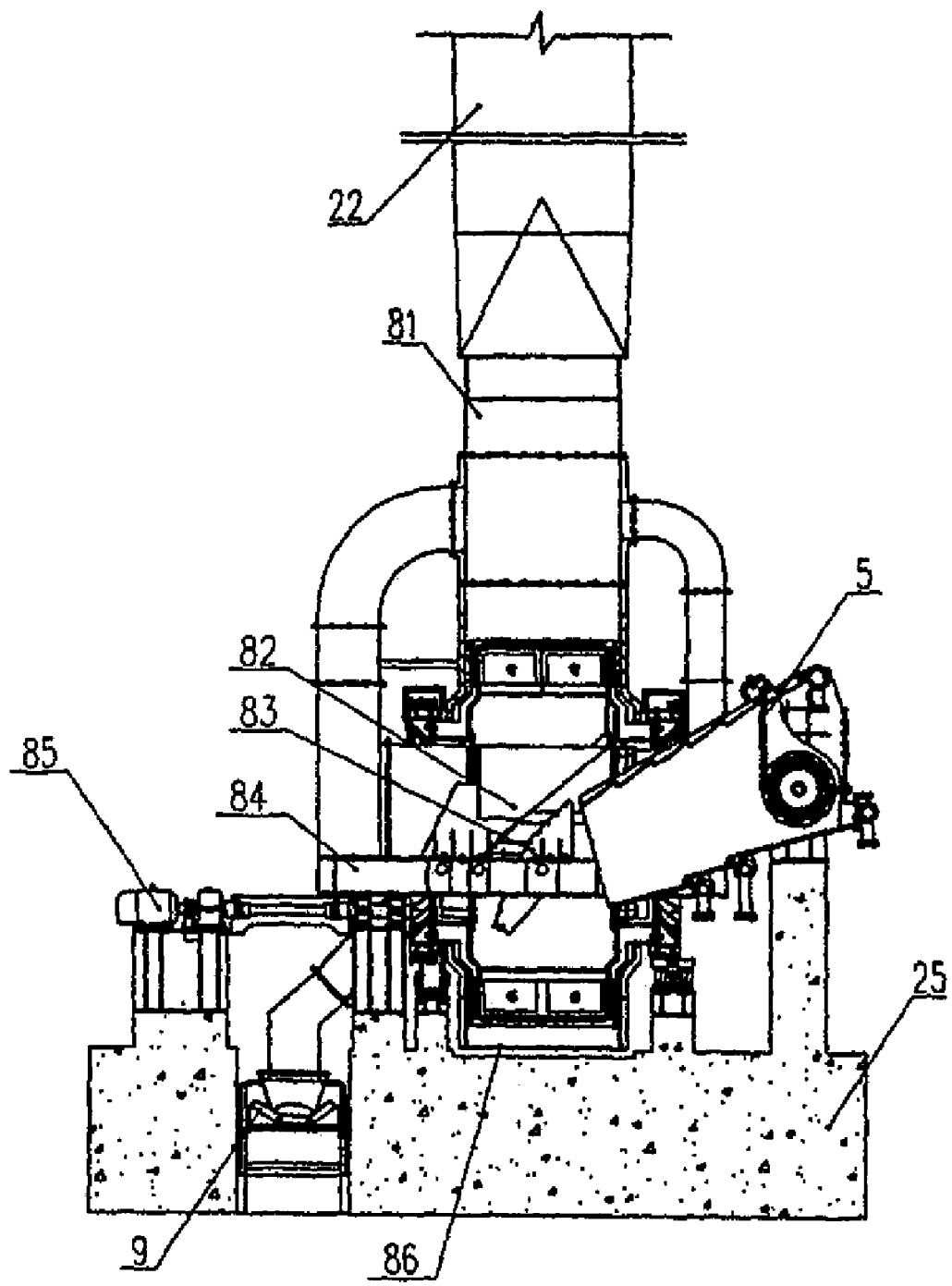
FIG. 10. is a longitudinal cross-sectional view of the slag granulating device according to the invention FIG. 11. a schematic view of the drying room according to the invention (longitudinal cross-section).

As shown in FIG. 10, FIG. 4 and FIG. 5, the granulating device 8 has a steel frame with a support beam 84, support beam 84 is fixed on a reinforced concrete base 25. An evaporator 85, a granulator 5, an effuse assembly 81 and a granulated slag output bucket 82 are provided on the support beam 84. There is a water flume 86 under the support beam. There is a slag trap 83 at the outlet of the granulator 5 and an inlet channel 4 at the inlet of the granulator. The upper end of the granulated slag output bucket 82 extends into the evaporator 85 and the lower end extends onto the conveyor belt near evaporator. There is a chimney 22 on the top of the granulating device.

As shown in FIG. 4 and FIG. 5, the granulating device 5 includes a granulating tube box 55, a granulating gear 56, a mechanism for driving the granulating gear, and a device for spraying water. There are an upper hose 51, a lower hose 52 and two bottom hoses 53, 54 provided on the granulating box. The mechanism for driving the granulating gear and the device for spraying water are the same as that of prior art and, therefore, will not be described in detail. The evaporator 85 includes a gyre tube, a gear ring, a support backing ring, a carrier roller, a pinch roller and a evaporator driver. The evaporator 85 is the same as the existing one and there is no need for detailed description herein.

As shown in the FIG. 5, FIG. 6, FIG. 7, FIG. 8, and FIG. 9, in order to increase the granulating efficiency of the granulating device and to improve its durability, in the present embodiment, each end of the granulating gear 56 is provided a terminal plate 561. A plurality of support radial plates 566 and removable knappers 562 are provided between the two terminal plates. A plurality of heat-radiating fins 5623 are provided on the knappers 562. A shaft sleeve 564 is provided in the center portion of the granulating gear 56. A half axis 565 is installed at one end of the shaft sleeve 564 and a half axis 567 is installed at the other end of shaft sleeve 564. The knapper mentioned above comprises a straight tooth 5622. A flange 5621 is connected with both ends of the knapper. The knapper 562 is installed on the terminal plate 561 through the flange 5621 so that it is convenient to replace the knapper. There is a splash ring 563 provided on the shaft sleeve 564 for cooling the knapper. The cooling water is ejected onto the splash ring from one end of the granulating gear and, then ejected onto the knappers with the help of splash ring to cool the granulating gear.

Figure 6:
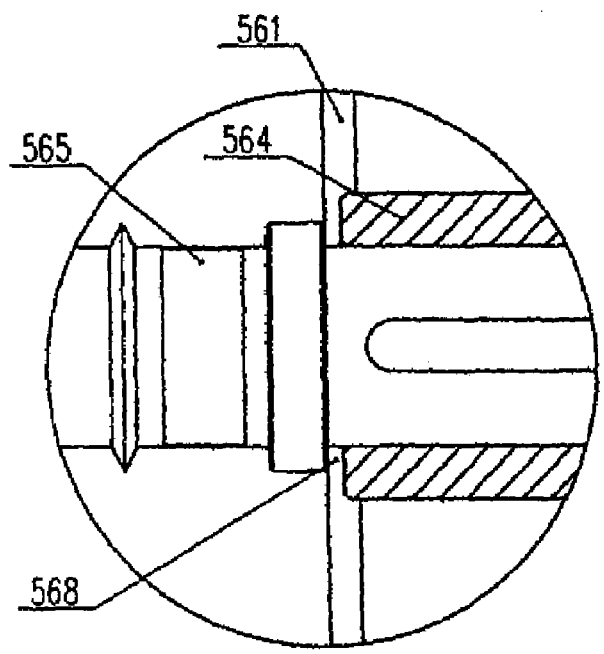
FIG. 6. is a schematic view of the neck portion of the granulating gear of the granulating device according to the invention ( enlarged view of section D of FIG. 5).
Figure 7:
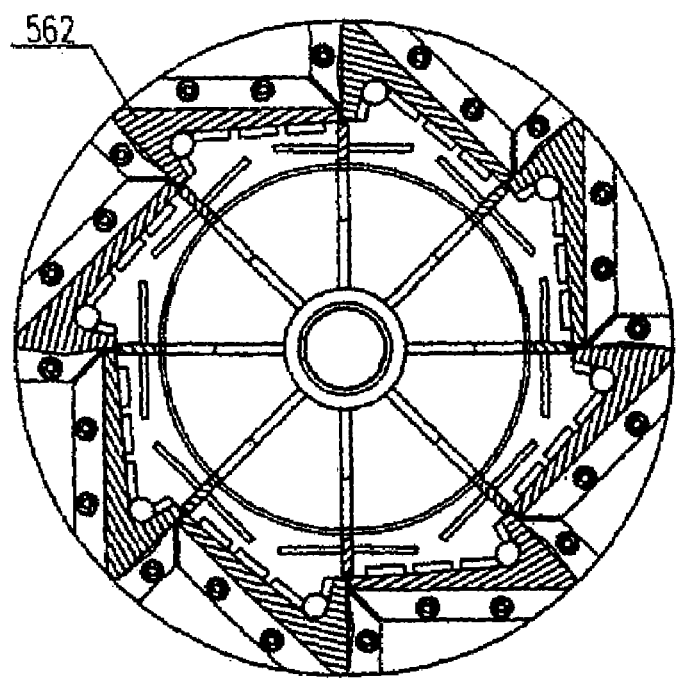
FIG. 7. is a traverse cross-sectional view of the granulating gear of the granulator in the invention C-C cutaway view of FIG. 5)
Figure 8:
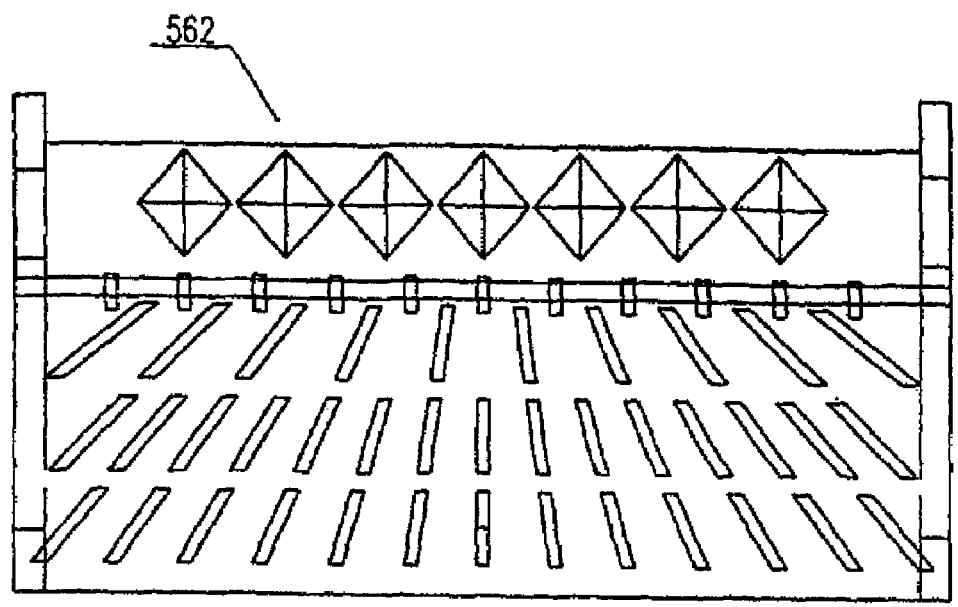
FIG. 8. is a schematic view of the knapper according to the invention (E view of FIG. 9)
Figure 9:
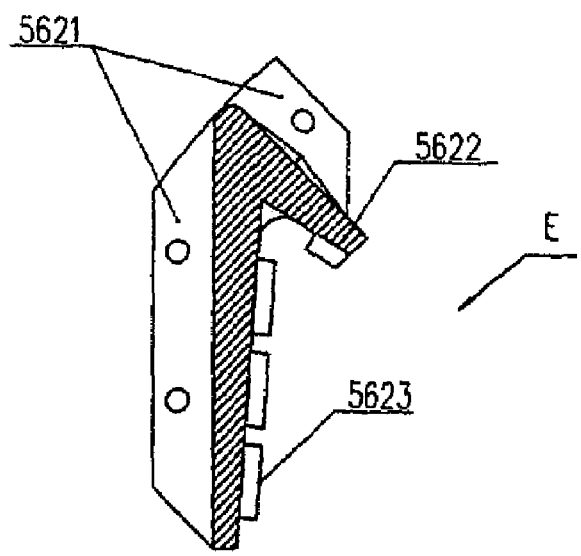
FIG. 9. is a cross-sectional view of the knapper according to the invention.

As shown in the FIG. 6, in the embodiment, an expansion absorbing trough 568 is provided between the half axis 565 and one end of the shaft sleeve 564 and between the half axis 567 and the other end of the shaft sleeve 564 for preventing possible damage to the bearing due to frequent temperature change of the granulating gear in working condition and the heat expansion of the two half axes and the shaft sleeve.

The invention claimed is:
1. A process for treating steel slag, comprising the steps of:
    collecting the steel slag into a tank and carrying the tank onto a tipping device by a hoisting equipment;

operating the tipping device to transport the steel slag to a granulating device and granulating the steel slag in the granulating device to form granulated slag;

transporting the granulated slag into a drying room with a conveyor, wherein the granulated slag is continuously dried in the drying room at a temperature between 200-300° C. for 30-60 second using exhaust heat from a converter; and transporting dried granulated slag, with the conveyor, to a magnetic separation device to separate carbon metal grains from nonmetal grains contained in the granulated slag.

2. A system for treating steel slag, comprising:

a hoisting equipment for moving a slag tank onto a tipping device, wherein an outlet of the tipping device couples with a granulating device, an outlet of the granulating device couples with a conveyor, a drying room is provided in the middle portion of the conveyor, a first magnetic separation device is provided at the inner side of a materiel flow from the exit of the conveyor, a second magnetic separation device is provided at the outer side of the materiel flow and under the first magnetic separation device, the tipping device comprises a tipping base, a tipping frame, a front stanchion, and a winding and raising mechanism, the drying room is connected to a hot air outlet of a heat exchanger.

3. The system for treating steel slag according to claim 2, characterized in that there are two terminal plates on both ends of a granulator gear of the granulating device, a plurality of support radial plates and removable knappers are provided between the two terminal plates, a plurality of heat-radiating fins are provided on the knappers, a shaft sleeve is provided in the center portion of the granulating gear, a first half axis is installed at one end of the shaft sleeve and a second half axis is installed at the other end of shaft sleeve, there is a splash ring for cooling the knapper.

4. The system for treating steel slag according to claim 2, characterized in that the drying room comprises a tubular body, a vent, a heat air inlet and a blocking valve, the drying room is connected with a first conveyor belt on its top part, and the blocking valve on the bottom part is coupled to a conveyor belt for transporting dried slag grains.

* * * * *